(12) United States Patent
Liu et al.

(10) Patent No.: US 8,459,873 B2
(45) Date of Patent: Jun. 11, 2013

(54) SELF-LUBRICATING COMPOSITE BEARING

(75) Inventors: Han-Ching Liu, Taipei County (TW); Lung-Wei Huang, Hsinchu (TW)

(73) Assignee: Newcara Technology Co., Ltd., Brunei Darussalam (BN)

( * ) Notice: Subject to any disclaimer, the term of this patent is extended or adjusted under 35 U.S.C. 154(b) by 782 days.

(21) Appl. No.: 12/624,173

(22) Filed: Nov. 23, 2009

(65) Prior Publication Data

US 2011/0123140 A1   May 26, 2011

(51) Int. Cl.
*F16C 33/02*   (2006.01)
*F16C 17/00*   (2006.01)
*F16C 33/10*   (2006.01)

(52) U.S. Cl.
USPC ........... 384/276; 384/129; 384/293; 384/296; 384/606; 384/286

(58) Field of Classification Search
USPC ............... 384/100, 129, 155, 160, 263, 265, 384/293, 286, 295–295, 606; 29/898.012, 29/898.15
See application file for complete search history.

(56) References Cited

U.S. PATENT DOCUMENTS

| | | | | |
|---|---|---|---|---|
| 1,774,488 A * | 8/1930 | Pecora | ........................... | 384/620 |
| 1,784,467 A * | 12/1930 | Scribner | ...................... | 384/459 |
| 2,019,464 A * | 10/1935 | Riblet | .............................. | 74/424 |
| 2,656,734 A * | 10/1953 | Newman et al. | .............. | 384/568 |
| 2,671,263 A * | 3/1954 | Hamilton | ........................ | 29/265 |
| 2,689,769 A * | 9/1954 | Ware, Jr. | ........................ | 301/5.7 |
| 2,836,473 A * | 5/1958 | Tydeman | ....................... | 384/563 |
| 2,955,443 A * | 10/1960 | Fulop | ............................. | 464/36 |
| 3,984,152 A * | 10/1976 | Haines | ........................... | 384/280 |
| 4,478,463 A * | 10/1984 | Takai et al. | .................... | 384/482 |
| 4,710,034 A * | 12/1987 | Tittizer et al. | ................... | 384/110 |
| 5,246,294 A * | 9/1993 | Pan | .................................. | 384/119 |
| 5,689,146 A * | 11/1997 | Cheever | .......................... | 310/90 |
| 5,873,657 A * | 2/1999 | Lee | ................................ | 384/110 |
| 5,957,587 A * | 9/1999 | Hong | ............................ | 384/108 |
| 6,144,523 A * | 11/2000 | Murthy et al. | ............. | 360/99.08 |
| 6,439,774 B1 * | 8/2002 | Knepper et al. | ........... | 29/898.15 |
| 6,755,570 B1 * | 6/2004 | Kennedy et al. | .............. | 384/110 |
| 6,955,471 B2 * | 10/2005 | Heine et al. | ................... | 384/110 |
| 7,101,085 B2 * | 9/2006 | Grantz et al. | ................. | 384/110 |
| 7,147,596 B2 * | 12/2006 | Reynolds | ......................... | 492/40 |
| 7,213,972 B2 * | 5/2007 | Grantz | .......................... | 384/110 |
| 7,390,125 B2 * | 6/2008 | Kennedy et al. | ............. | 384/110 |
| 2003/0223660 A1 * | 12/2003 | Grantz et al. | ................. | 384/110 |

FOREIGN PATENT DOCUMENTS

| DE | 10 2005 027 516 A1 * | 6/2005 |
|---|---|---|
| EP | 690241 A1 * | 1/1996 |
| JP | 200321136 A * | 1/2003 |

* cited by examiner

*Primary Examiner* — Marcus Charles
(74) *Attorney, Agent, or Firm* — Muncy, Geissler, Olds & Lowe, PLLC (57) ABSTRACT

A self-lubricating composite bearing includes a casing and a bearing set. The bearing set comprises at least two bearing members. The casing axially defines an accommodation space through two opposite ends thereof for mounting the bearing set therein. An axial hole is defined through two opposite ends of the bearing set for the insertion of a shaft. The bearing set includes at least one neck portion. At least one storage chamber is defined between an inner surface of the casing and an outer surface of the at least one neck portion of the bearing set and stores a higher viscosity lubricant therein. At least one fine flow passage is defined through the at least one neck portion of the bearing set. The at least one storage chamber is in fluid communication with the axial hole of the bearing set via the at least one fine flow passage.

15 Claims, 8 Drawing Sheets

SELF-LUBRICATING COMPOSITE BEARING

BACKGROUND OF THE INVENTION

1. Field of the Invention

The present invention relates to a bearing for supporting a rotated shaft, and particularly to a self-lubricating composite bearing that automatically supplies lubricating media with different viscosities to form a smoothening tribology interface around the periphery of the rotated shaft even under a variety of severe operating conditions.

2. Description of the Related Art

To avoid friction-induced constraints between shaft and bearing, a lubricating medium is generally applied to form a smoothening tribology interface around the periphery of the rotated shaft being supported in the bearing. However, it is inconvenient and laborious to regularly apply the lubricant to a bearing. In case the lubricating medium is not supplied in time, friction-induced heat will be generated causing insufficient lubrication and rapidly damage. To mitigate this problem, self-lubricating bearings are created. The lubricating media can be classified as lower viscosity lubricating oil and higher viscosity lubricant (including but not limited to such as grease, hybrid lubrication agent containing solid lubricating grains). Conventional self-lubricating bearings commonly use the lubricating oil for forming a tribology interface between the axial hole of the bearing and the periphery of the rotated shaft being supported in the bearing. However, the tribology interface formed by the lubricating oil has a thin thickness, limiting the side-load capacity of the bearing. Further, the higher the temperature, the lower is the viscosity of the lubricating oil, causing the tribology interface to be thinner. If the shaft is continuously rotated at a high speed and with a thinning tribology interface, the lubricating oil may be forced away from the axial hole of the bearing, causing the shaft being directly worn out or even collided with the bearing. Under such a condition, the friction-induced heat and noise will speed up the bearing damage.

On the contrary, the grease has a viscosity higher than that of the lubricating oil, forming a relatively thicker tribology interface within a bearing around the periphery of the shaft and enhancing the loading capacity of the bearing. Because of the characteristic of high viscosity, grease is commonly used in ball bearings. However, conventional ball bearing comprises many long and thin components. As compared with the self-lubricating bearing, conventional ball bearing has the drawbacks of high cost, noisy, complicated structure and weaker structural strength. When a ball bearing is applied to high temperature, high subzero temperature, high load and high speed conditions, the loading capacity, resistance against high- and low-temperature and lifespan of the ball bearing will confront a critical challenge. As compared with the ball bearing, the self-lubricating bearing has the advantages of low cost, quiet, simple structure and higher structural strength. Nevertheless, self-lubricating bearing is usually made from a porous material that is not practical for impregnating with lubricant such as grease or hybrid lubrication agent containing solid lubricating grains for forming an evenly distributed tribology interface due to poor mobility in the pores. The mobility is getting worse under a low operational temperature condition. Directly applying lubricant to the inner wall of a self-lubricating bearing for supporting a shaft in the bearing can temporarily enhance the loading capacity, however friction-induced temperature rise problems will occur soon after consuming of the applied lubricant for a high speed rotation of the shaft.

Accordingly, it is desirable to provide a self-lubricating composite bearing that continuously supplies lubricating medium to form an evenly distributed tribology interface in between the shaft and bearing when applied to abnormal high- and low-temperatures, high load and high speed conditions.

SUMMARY OF THE INVENTION

The present invention has been accomplished under the circumstances in view. It is one object of the present invention to provide a self-lubricating composite bearing, which provides lubricating medium, such as lubricating oil and lubricant (including such as grease, hybrid lubrication agent containing solid lubricating grains), storing and supplying structure for application under high temperature, low temperature (particularly to a high subzero temperature), high load and high speed conditions to fit different industrial requirements, so that an evenly distributed tribology interface can be formed within the inner wall thereof around the periphery of the shaft being supported therein to smoothen rotation of the shaft.

It is another object of the present invention to provide a self-lubricating composite bearing, which utilizes bearing members made from a lubricating oil-impregnated porous material to support a rotated shaft, and has storage rooms for storing lubricating oil, and also has storage chambers for storing lubricants having different viscosities and fine flow passages for guiding lubricants from the storage chambers to the axial hole of bearing set therein, so that the lubricants are continuously delivered from the storage chambers to the axial hole of the bearing set through the fine flow passages and the lubricating oil is forced out of the bearing set into the axial hole of the bearing set by means of a capillary force during high speed rotation of the shaft.

It is still another object of the present invention to provide a modularized design of self-lubricating composite bearing application platform, which simplifies the fabrication of bearing members, facilitates quality control of the fabrication of bearing members, and lowers the manufacturing cost of bearing members.

To achieve these and other objects of the present invention, the self-lubricating composite bearing comprises a casing and a bearing set. The casing axially defines an accommodation space through two opposite ends thereof. The bearing set comprises at least two bearing member axially mounted in the accommodation space inside the casing. Each bearing member has a mounting portion located on one end thereof, a connection portion located on an opposite end thereof, a neck connected between the mounting portion and the connection portion, an axle hole axially cut through the mounting portion, the neck and the connection portion for the insertion of a shaft to be supported by the self-lubricating composite bearing, at least one storage chamber defining around the periphery of the neck within the casing and storing a lubricant, and at least one fine flow passage in fluid communication between the at least one storage chamber and the axle hole of each bearing member.

The bearing members can be made from a porous material and define with the inner wall of the casing at least one storage room for storing a lubricating oil. Thus, the lubricating oil can be delivered from the at least one storage room to the axle holes of the bearing members through the at least one fine flow passage to form the desired tribology interface around the periphery of the shaft.

Alternatively, the bearing members can be made from a lubricating oil-impregnated porous material and define with the inner wall of the casing at least one storage chamber for storing a lubricant and at least one storage room for storing a lubricating oil. Thus, the lubricant is delivered from the at least one storage chamber to the axle holes of the bearing members through the at least one fine flow passage subject to the effect of the centrifugal force produced during a high speed rotation of the shaft in the axle holes of the bearing members. In the meantime, the lubricating oil both impregnated in the porous material of the bearing members and stored in the storage room is delivered to the axle holes of the bearing members subject to the effect of the capillary force of the bearing members. Therefore, an evenly distributed tribology interface is formed in the axle holes of the bearing members around the periphery of the shaft, smoothening rotation of the shaft and prolonging the lifespan of the self-lubricating composite bearing.

To fit different application requirements under different speed, temperature and load conditions, different lubricants and different numbers and sizes of fine flow passages may be adopted for assuring excellent mobility in the fine flow passages.

Further, to fit different bearing length requirements, different application requirements and different lubrication requirements, the number, arrangement and configurations of bearing members can be relatively changed.

DETAILED DESCRIPTION OF THE PREFERRED EMBODIMENT

Referring to FIGS. 1-5, a self-lubricating composite bearing according to a first embodiment includes a casing 1 and a bearing set 2.

The casing 1 is a hollow cylindrical member made from a dense solid or porous material. The casing 1 axially defines an accommodation space 10 through two opposite ends thereof for accommodating the bearing set 2. A plurality of ribs 11 are formed on an inner surface of the casing 1. The ribs 11 extend along an axial direction of the casing 1 and are evenly spaced from each other around the inner surface of the casing 1.

The bearing set 2 is mounted in the accommodation space 10 of the casing 1, and includes two bearing members 21 made from a dense solid or porous material and axially arranged together in the casing 1. An axial hole 210 is defined through two opposite ends of the bearing set 2 for the insertion of a shaft 3 to be supported by the self-lubricating composite bearing. The bearing member 21 has a mounting portion 211, a connection portion 213 having an outer diameter smaller than that of the mounting portion 211, and a neck 212 axially connected between the mounting portion 211 and the connection portion 213. An axle hole 215 is axially defined through the mounting portion 211, the neck 212 and the connection portion 213. The necks 212 and connection portions 213 of the two adjacent bearing members 21 cooperatively forms the neck portion 214 of the bearing set 2. A plurality of locating grooves 2111 are axially defined in an outer peripheral surface of the mounting portion 211 corresponding to the ribs 11 of the casing 1 for respectively receiving the ribs 11 of the casing 1 therein. The mounting portion 211 of each bearing member 21 fits the inner diameter of the casing 1, i.e., the configuration of the mounting portion 211 fits the cross section of the accommodation space 10 so that the mounting portion 211 can be press-fitted into the casing 1 tightly.

After installation of the two bearing members 21 in the casing 1, a storage chamber 20 is defined between the inner surface of the casing 1 and an outer surface of a neck portion 214 of the bearing set 2 within the accommodation space 10 for storing a higher viscosity lubricant therein. The axle holes 215 of the two bearing members 21 cooperatively define an axial hole 210 of the bearing set 2 for the insertion of a shaft 3. A plurality of fine flow passages 2130 are defined through a middle of the neck portion 214 of the bearing set 2. The storage chamber 20 is in fluid communication with the axial hole 210 of the bearing set 2 via the fine flow passages 2130. The lubricant can be any substance to be introduced between an inner surface of the bearing set 2 and an outer surface of the shaft 3 to reduce the friction between them, improving efficiency and reducing wear. For instance, the lubricant can be a liquid lubricant containing 90% base lubricating oil and less than 10% additives. Alternatively, the lubricant can be grease, a hybrid lubrication agent containing solid lubricating grains or any of a variety of lubricants.

According to this embodiment, the two bearing members 21 of the bearing set 2 are separately made. Alternatively, the two bearing members 21 of the bearing set 2 can be integrally formed as a monolithic piece. The neck 212 of each bearing member 21 is shaped like a hollow truncated cone, sloping inwardly from the mounting portion 211 toward the connection portion 213. The connection portion 213 is located on the contracted end of the neck 212. The connection portion 213 is annular shaped and defines a plurality of semicircular notches 2131 at a free end thereof. When the two bearing members 21 are arranged together in the casing 1 with the connection portion 213 of one bearing member 21 abutting against the connection portion 213 of the other bearing member 21, the notches 2131 of the one bearing member 21 are respectively abutted against the notches 2131 of the other bearing member 21, thereby forming the fine flow passages 2130. Thus, when the casing 1 and the bearing set 2 are assembled, the desired storage chamber 20 is defined within the casing 1 around the necks 212 of the two bearing members 21 for storing the lubricant. Further, the notches 2131 can be elongated to a certain extent toward the mounting portion 211 of the bearing member 21 to guide distribution of the lubricant from the storage chambers 20 to the axial hole 210 of the bearing set 2 for forming an evenly distributed tribology interface around the periphery of the shaft (not shown) that is rotatably inserted through the axial hole 210.

Figure 1:
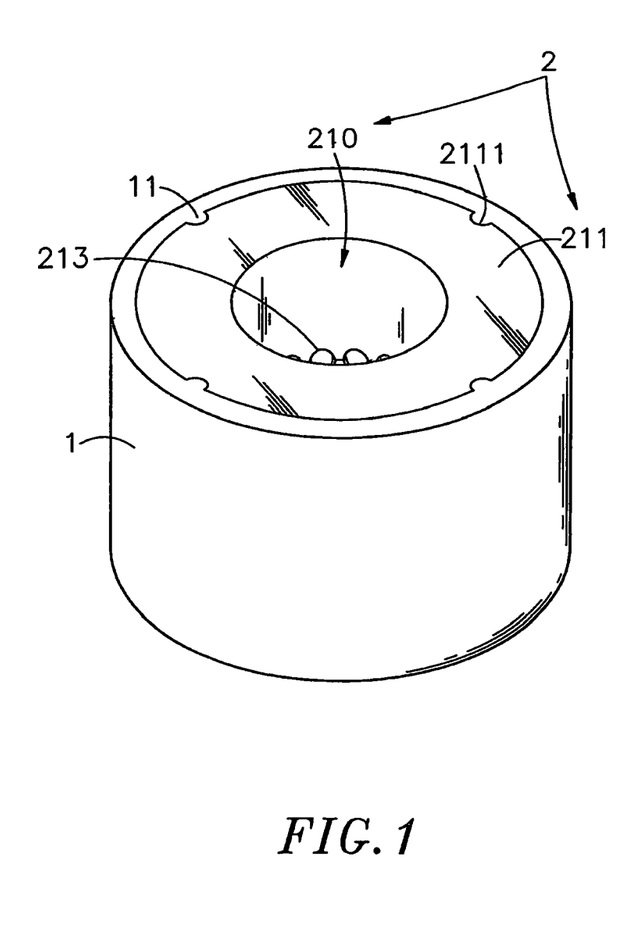
FIG. 1 is an assembled, isometric view of a self-lubricating composite bearing in accordance with a first embodiment of the present invention.
Figure 2:
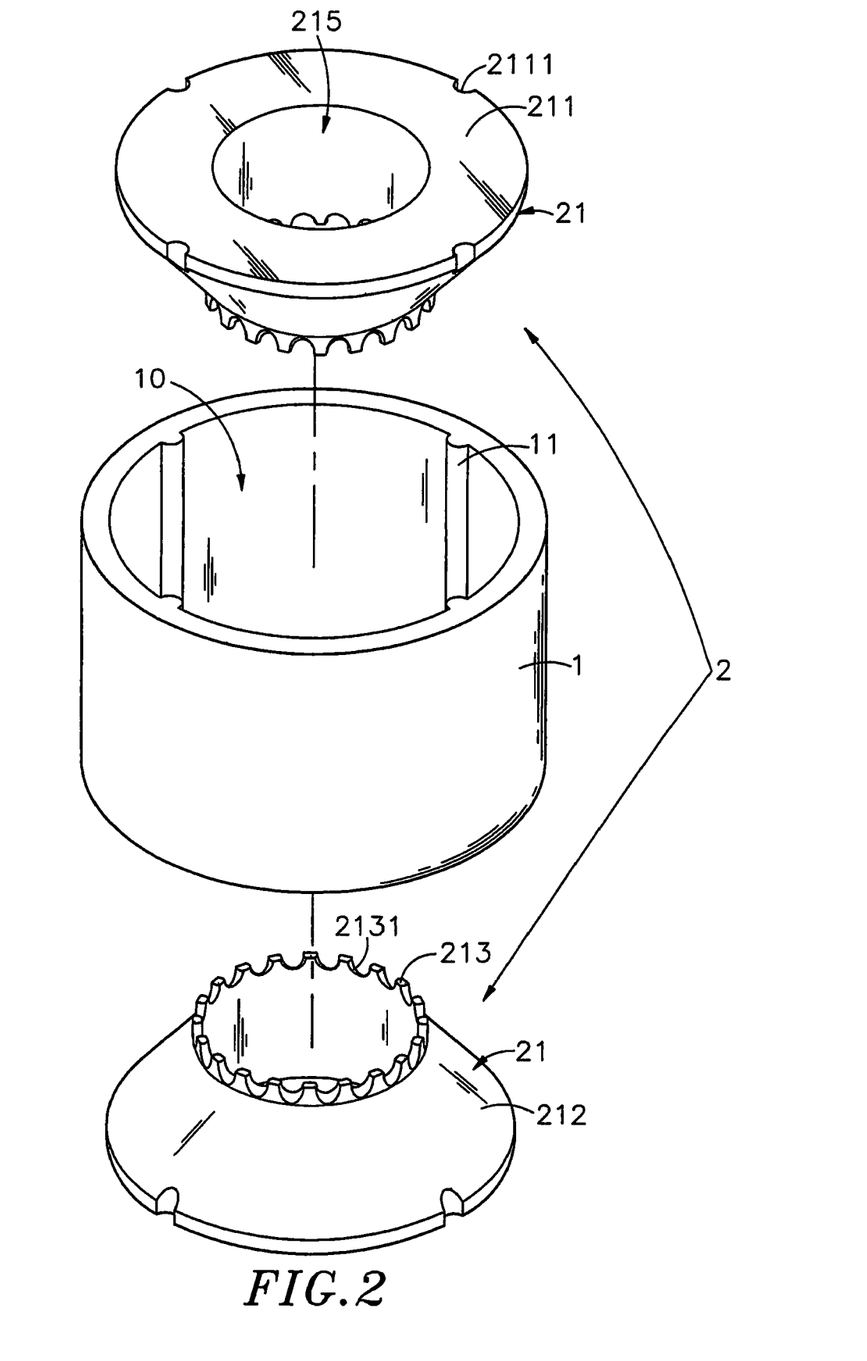
FIG. 2 is an exploded view of the self-lubricating composite bearing of FIG. 1.
Figure 3:
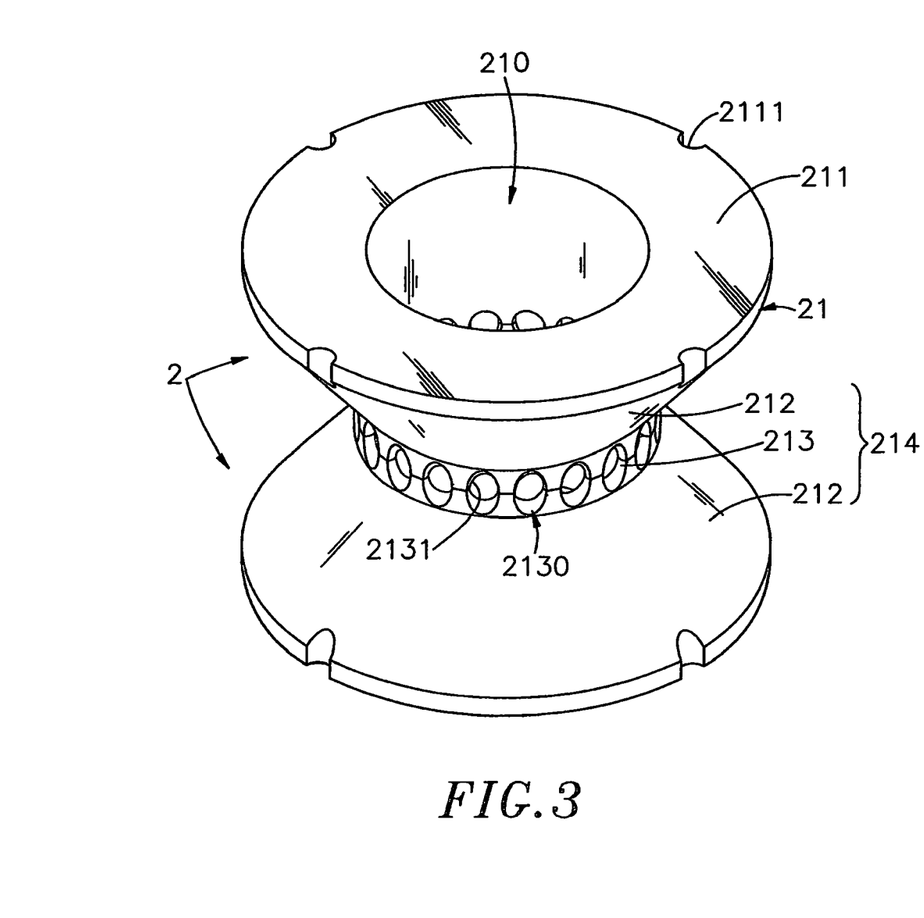
FIG. 3 is an assembled, isometric view of a bearing set of the self-lubricating composite bearing of FIG. 1.
Figure 4:
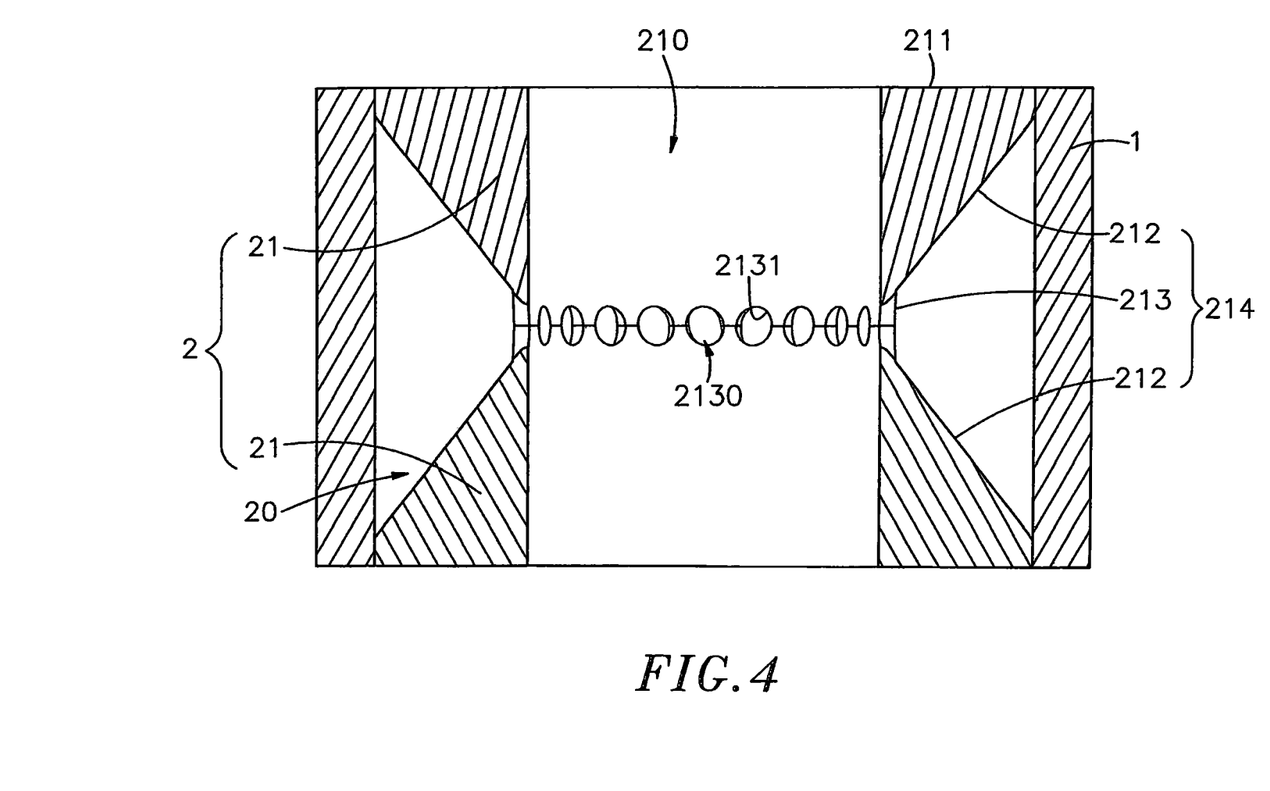
FIG. 4 is a sectional view of the self-lubricating composite bearing of FIG. 1.
Figure 5:
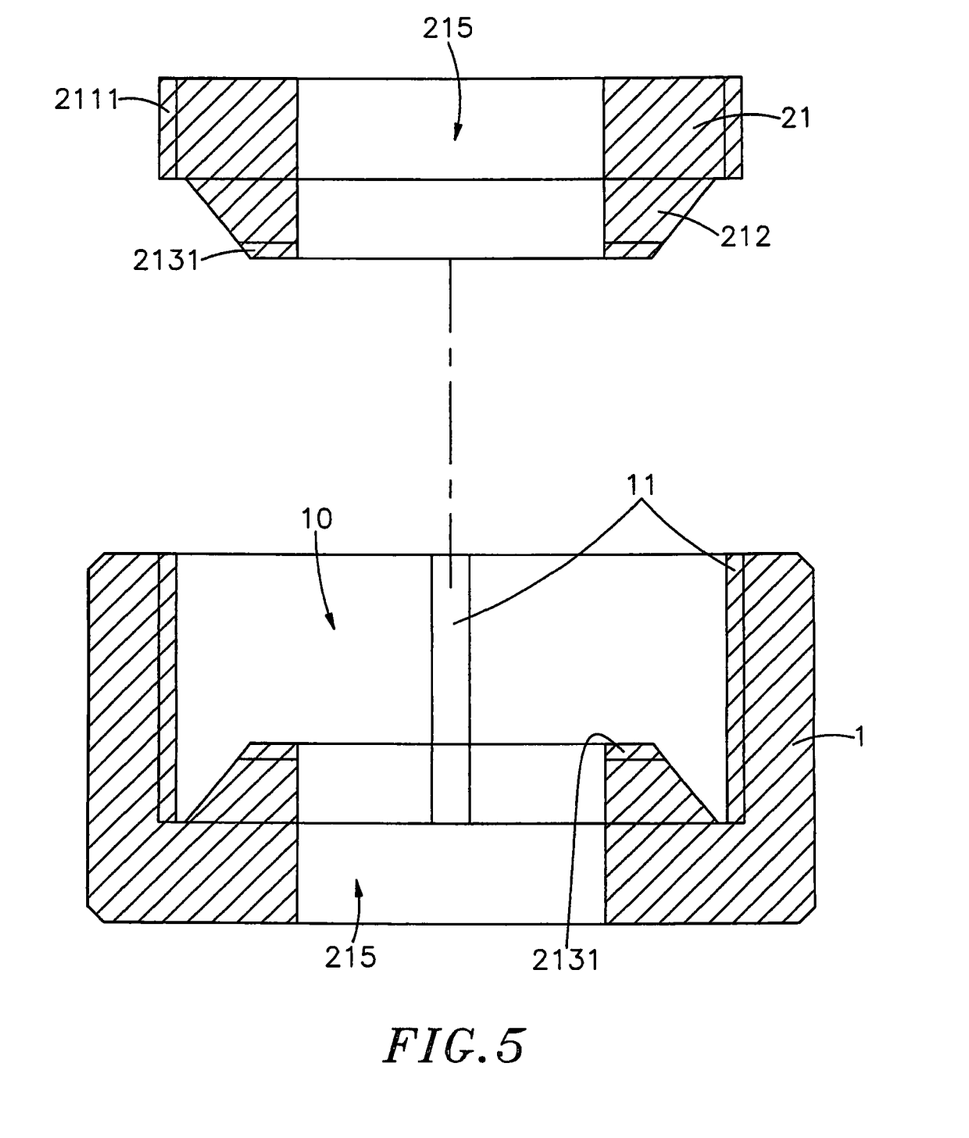
FIG. 5 is another exploded sectional view of the self-lubricating composite bearing of FIG. 1.

The configuration of the storage chamber 20 is determined subject to the configuration of the necks 212 of the two bearing members 21. By means of changing the configuration of the necks 212 of the bearing members 21, the configuration of the storage chamber 20 is relatively changed. Therefore, the storage chamber 20 can be configured to show a triangular, rectangular, or arched cross section. Further, as illustrated in FIG. 5, one of the bearing members 21 of the bearing set 2 and the casing 1 can be integrally formed as a monolithic piece.

During rotation of the shaft 3 that is mounting in the axial hole 210 of the bearing set 2, friction-induced heat is produced, causing the lubricant to expand. At this time, the viscosity of the lubricant is lowered, and the mobility of the lubricant is enhanced. Thus, the lubricant flows from the storage chamber 20 through the fine flow passages 2130 into the axial hole 210 to lubricate the shaft 3. Further, the centrifugal force produced subject to rotation of the shaft 3 causes the pressure at the inner side of the fine flow passages 2130 that faces the axial hole 210 to become lower than the pressure at the outer side of the fine flow passages 2130 that faces the storage chamber 20. This pressure difference enhances flowing of the lubricant from the storage chamber 20 toward the axial hole 210 to form a tribology interface between the shaft 3 and the axial hole 210. The tribology interface thus formed has a thickness much greater than that formed in a conventional self-lubricating bearing having approximately the same size.

Further, if the bearing members 21 are made from a lubricating oil-impregnated porous material, the production of friction-induced heat during rotation of the shaft 3 in the axial hole 210 causes the lubricating oil impregnated in the capillaries of the bearing members 21 to expand and to be forced out of the capillaries of the bearing members 21 to the inside of the axial hole 210 by the capillary force, thereby forming a tribology interface around the periphery of the shaft 3. Flowing of the lubricating oil toward the axial hole 210 enhances lubrication of the shaft 3, preventing overheating. Thus, the self-lubricating composite bearing of the present invention automatically supplies the lubricant stored in the storage chamber 20 and the lubricating oil impregnated in the capillaries of the bearing members 21, and therefore the invention greatly prolongs the lifespan of the self-lubricating composite bearing and enhances the support of the self-lubricating composite bearing to the shaft 3.

Figure 6:
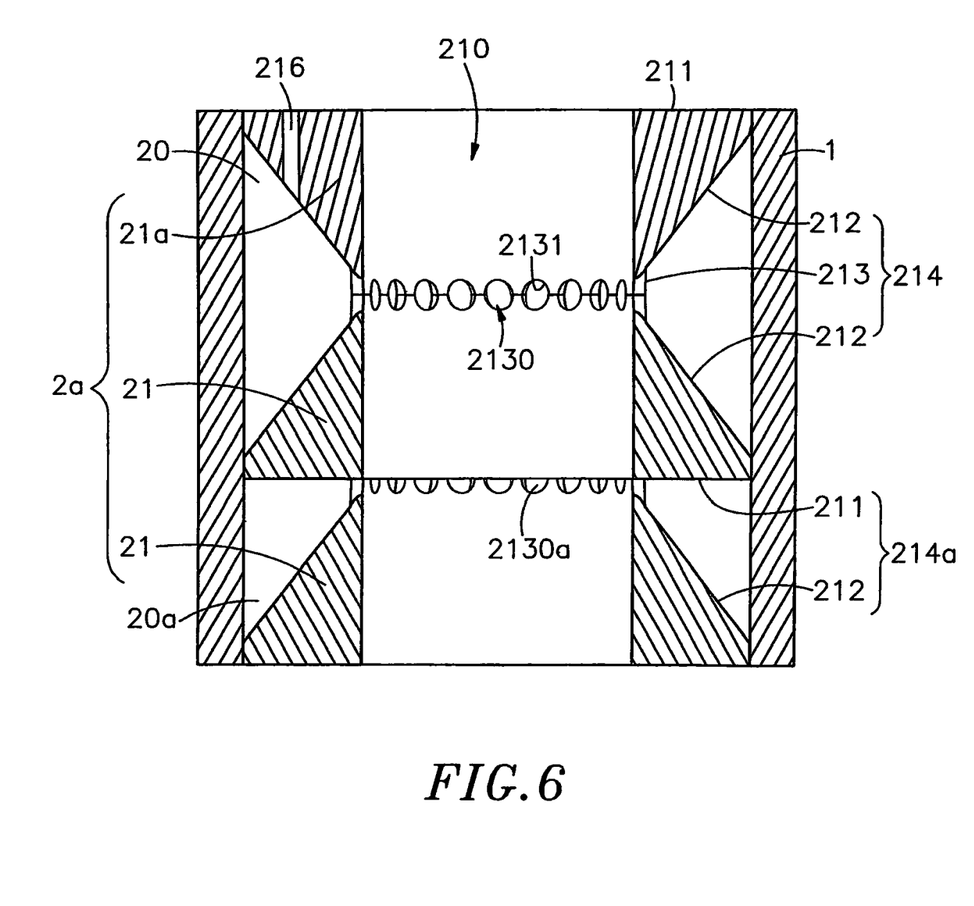
FIG. 6 is a sectional view of a self-lubricating composite bearing in accordance with a second embodiment of the present invention.

FIG. 6 is a sectional view of a self-lubricating composite bearing in accordance with a second embodiment of the present invention. A bearing set 2a in according to this second embodiment comprises three bearing members 21, 21a axially arranged together in the accommodation space 10 of the casing 1. At least one tiny hole 216 is defined through the mounting portion 211 and the neck 212 of a bearing member 21a. The other two bearings 21 are substantially similar to the aforesaid first embodiment. After installation of the bearing set 2a in the casing 1, two storage chambers 20, 20a are defined between the inner surface of the casing 1 and the outer surface of two neck portions 214, 214a of the bearing set 2a for storing a higher viscosity lubricant therein. In such a way, the mobility of the lubricant in the storage chamber 20 can be enhanced by making the storage chamber 20 in fluid communication with the environment via the at least one air passage, such as the tiny through hole 216 at the mounting portion 211 of the bearing member 21a. In fact, the at least one tiny hole 216 also can be defined in all three bearing members 21, 21a or two bearing members of the bearing set 2a for assuring excellent mobility of the lubricant in the fine flow passages 2130, 2130a.

If the bearing members 21, 21a according to this second embodiment have the same length as the aforesaid first embodiment, the self-lubricating composite bearing of this second embodiment provides a relatively longer bearing length of support to the shaft 3. To provide the same bearing length of support to the shaft 3 as the aforesaid first embodiment, the bearing members 21, 21a of the bearing set 2a must be made shorter than that of the aforesaid first embodiment. When placing the bearing set 2a in the casing 1, each two adjacent bearing members can be arranged in the same direction and connected in series, or reversely abutted against each other.

When two adjacent bearing members 21 (particularly, the upper bearing member 21a and the middle bearing member 21) are reversely abutted against each other, the connection portion 213 of one of the bearing members 21a is abutted against the connection portion 213 of the other of the bearing members 21 so that the notches 2131 of the connection portions 213 of the two adjacent bearing members 21, 21a form fine flow passages 2130, where the number of the fine flow passages 2130 is equal to the number of the notches 2131 of the connection portion 213 of each bearing member, and the cross-sectional area of each fine flow passage 2130 is double the dimension of each of the notches 2131. At this time, the necks 212 and the connection portions 213 of the two adjacent bearing members 21, 21a cooperatively form a neck portion 214 of the bearing set 2a. Therefore, a storage chamber 20 with the same capacity of the aforesaid first embodiment is defined within the accommodation space 10 of the casing 1 around the neck portion 214 of the two adjacent bearing members 21, 21a that are reversely abutted against each other.

Further, when two adjacent bearing members 21 (particularly, the middle bearing member 21 and the lower bearing member 21) are arranged in the same direction and connected in series, the connection portion 213 of one of the bearing members 21 is abutted against the mounting portion 211 of the other of the bearing members 21, so that the notches 2131 of the connection portion 213 of one of the bearing members 21 and the mounting portion 211 of the other bearing member 21 cooperatively define a plurality of fine flow passages 2130a, where the number and cross-sectional area of the fine flow passages 2130a are equal to the number and cross-sectional area of notches 2131 of the connection portion 213 of one of the bearing members 21. At this time, the neck 212 and the connection portion 213 of the lower bearing member cooperatively form another neck portion 214a of the bearing set 2a. A storage chamber 20a is defined within the accommodation space 10 of the casing 1 around the neck 212 of the one of the bearing members 21 that is abutted against the mounting portion 211 of the other of the bearing members 21. The capacity of the storage chamber 20a is one half of the capacity of the storage chamber 20 defined around the neck portion 214a of the two adjacent bearing members 21 that are arranged in the same direction and connected in series.

To maintain the same bearing length, the length of the bearing members 21, 21a of the bearing set 2a can be relatively shortened when the number of the bearing members is increased. By means of increasing the number of the bearing members without changing the bearing length and by means of arranging each two adjacent bearing members in the same direction or two reversed directions, the number of storage chambers 20, 20a can be relatively increased. When the shaft 3 that is supported in the axial hole 210 of the bearing set 2a is rotating, the lubricant is continuously supplied from the storage chambers 20, 20a. The lubricating oil is also continuously supplied from the capillaries of the lubricating oil impregnated in the bearing members 21, 21a to form an evenly distributed tribology interface around the periphery of the shaft 3, prohibiting abnormal rise of temperature, enhancing bearing power and prolonging the lifespan of the self-lubricating composite bearing.

In this embodiment, the three bearing members 21, 21a of the bearing set 2a are separately made. Alternatively, the three bearing members 21, 21a or two adjacent bearing members of the bearing set 2a can be integrally formed as a monolithic piece. Further, at least one of the three bearing members 21, 21a of the bearing set 2a and the casing 1 can be integrally formed as a monolithic piece.

Figure 7:
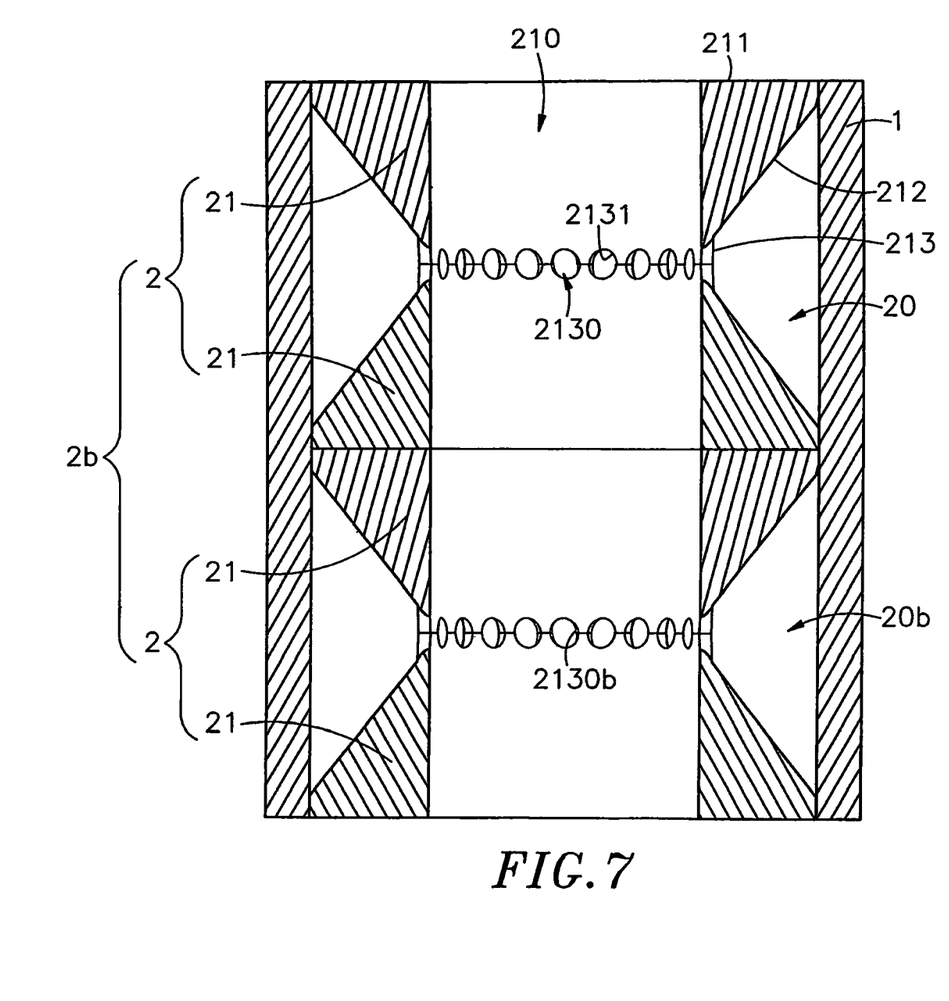
FIG. 7 is a sectional view of a self-lubricating composite bearing in accordance with a third embodiment of the present invention.

FIG. 7 is a sectional view of a self-lubricating composite bearing in accordance with a third embodiment of the present invention. This third embodiment is substantially similar to the aforesaid first and second embodiments with the exception that the bearing set 2b according to this third embodiment comprises four bearing members 21. According to this third embodiment, the four bearing members 21 are arranged in two sets connected in series. Each of the sets is defined a bearing set 2 similar to the aforesaid first embodiment. The two adjacent bearing members 21 of each of the two sets reversely abutted against each other so that two storage chambers 20, 20b of equal capacity are defined within the casing 1 around the necks 212 of the two adjacent bearing members 21. Further, two sets of fine flow passages 2130, 2130b are respectively defined in the two sets of bearing members 21 in fluid communication between the two storage chambers 20, 20b and the axial hole 210 of the bearing set 2b to guide distribution of the lubricant from the storage chambers 20, 20b to the axial hole 210 of the bearing set 2b for forming an evenly distributed tribology interface around the periphery of the shaft (not shown) that is rotatably inserted through the axial hole 210.

In this embodiment, the four bearing members 21 of the bearing set 2b are separately made. Alternatively, the four bearing members 21, two adjacent bearing members 21, or three adjacent bearing members 21 of the bearing set 2b can be integrally formed as a monolithic piece. Further, at least one of the four bearing members 21 of the bearing set 2b and the casing 1 can be integrally formed as a monolithic piece.

Figure 8:
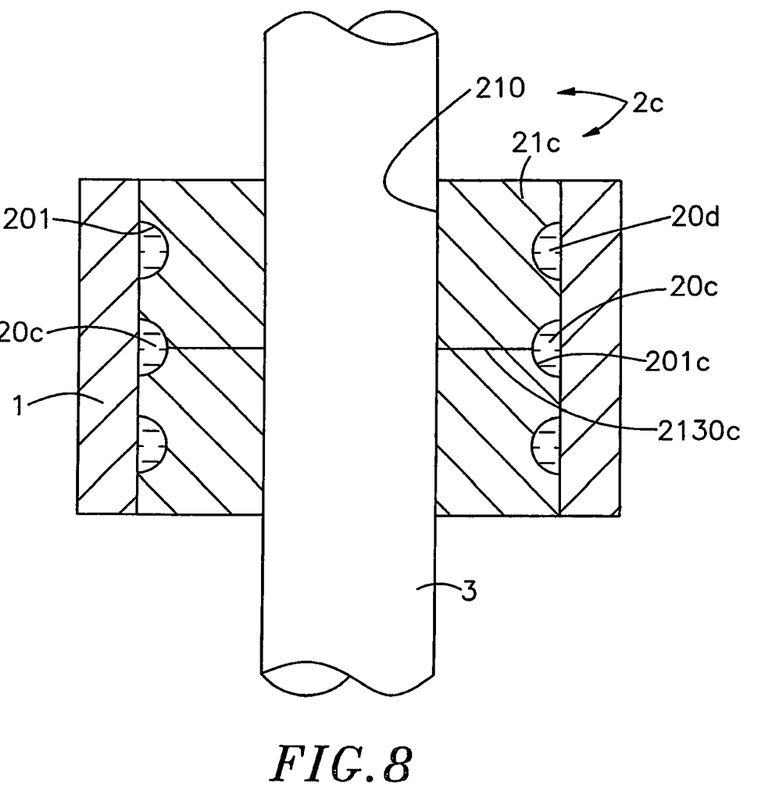
FIG. 8 is a sectional view of a self-lubricating composite bearing in accordance with a fourth embodiment of the present invention, showing a shaft installed therein.

FIG. 8 is a sectional view showing a shaft 3 installed in a self-lubricating composite bearing in accordance with a fourth embodiment of the present invention. According to this fourth embodiment, each of the two bearing members 21c is made from lubricating oil-impregnated porous material and forms a first neck 201 at a middle thereof and a second neck 201c at an end thereof. A storage chamber 20c is defined between the inner surface of the casing 1 and an outer surface of the second necks 201c of the two bearing members 21c. A storage room 20d is defined between the inner surface of the casing 1 and an outer surface of the first neck 201 of each of the two bearing members 21c. The middle storage chamber 20c around the second necks 201c of the two bearing members 21c is adapted for storing a higher viscosity lubricant such as grease or a hybrid lubrication agent containing solid lubricating grains. Two storage rooms 20d each around the first neck 201 of one of the two bearing members 21c are adapted for storing lubricating oil. Further, fine flow passages 2130c are defined in the bearing set 2c in fluid communication between the middle storage chamber 20c and the axial hole 210 of the bearing set 2c. In this embodiment, the fine flow passages 2130c are gaps between two adjacent bearing members 21c. During operation, the lubricant and the lubricating oil are continuously supplied to the axial hole 210 to form a tribology interface around the periphery of the shaft 3, smoothening rotation of the shaft 3 and prolonging the lifespan of the self-lubricating composite bearing.

According to the aforesaid embodiments of the present invention, an equivalent/hydraulic diameter of the fine flow passages of the self-lubricating composite bearing is not smaller than 0.01 millimeter and not larger than $(1.6 D*T/n)^{0.5}$ millimeter, where the symbol D indicates a diameter in millimeter of the axial hole 210 of the bearing set 2, 2a, 2b, 2c, the symbol T indicates an axial length in millimeter of the axial hole 210 of the bearing set 2, 2a, 2b, 2c, (i.e., an axial length summation of the axle holes 215 of the bearing members 21, 21a, 21c), and the symbol n indicates a number of the fine flow passages 2130, 2130a, 2130b, 2130c.

In conclusion, the invention provides a self-lubricating composite bearing that continuously supplies a lubricant and a lubricating oil to form a uniformly distributed tribology interface in the axle holes 215 of the bearing members 21, 21a, 21c around the periphery of the shaft 3 during rotation of the shaft 3 in the axial hole 210. Subject to the desired bearing length to support the shaft 3, the number and configurations of the bearing members 21, 21a, 21c can be changed. The bearing members 21, 21a, 21c can be made having a conical profile (see the embodiments from the first to the third), a rhombic or cylindrical shape (see the fourth embodiment) configuration, Further, each two adjacent bearing members 21, 21a, 21c can be arranged in the same direction and connected in series, or reversely abutted against each other. Also, one storage chamber 20, or multiple storage chambers 20, 20a, 20b, 20c are defined in the casing 1 around the necks 212 of the bearing members 21, 21a, 21c and disposed in fluid communication with the axle holes 215 of the bearing members 21, 21a through fine flow passages 2130, 2130a, 2130b, 2130c. At least one storage room 20d is defined in the casing 1 around the neck 201 of the bearing members 21c and disposed in fluid communication with the axle holes 215 of the bearing members 21c through the lubricating oil-impregnated in the capillaries of the bearing members 21c. So that a variety of lubricants and lubricating oil having different viscosities can be continuously supplied to the axial hole 210 to form a tribology interface in the axial hole 210 around the periphery of the shaft 3.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What the invention claimed is:

1. A self-lubricating composite bearing comprising:

a casing axially defining an accommodation space through two opposite ends thereof; and a bearing set including at least two bearing members axially arranged together with one of the bearing member abutting against another adjacent bearing member, each bearing member having a mounting portion at one end with a largest radial dimension of an outer peripheral surface and a neck axially extended from the mounting portion with a smaller radial dimension of an outer peripheral surface than that of the mounting portion, each bearing member further having a connection portion at an end of the neck on an opposite side of the mounting portion, an axle hole being axially defined through two opposite ends of each bearing member, the outer peripheral surfaces of the mounting portions of the at least two bearing members allowing the bearing set to be securely encased in the accommodation space of the casing to form the self-lubricating composite bearing, the axle holes of the at least two bearing members forming an axial hole of the bearing set for the insertion of a rotating shaft to be supported by the self-lubricating composite bearing, the necks and connection portions between two adjacent bearing members cooperatively forming a neck portion of the bearing set, and a storage chamber being defined between an inner surface of the casing and an outer surface of the neck portion for storing a higher viscosity lubricant therein;

wherein a plurality of notches are formed on a free end of the connection portion of each bearing member and communicated with the neck and the axle hole, the notches between the two adjacent bearing members forming a set of multiple fine flow passages, and the storage chamber being in fluid communication with the axial hole of the bearing set via the fine flow passages.

2. The self-lubricating composite bearing as claimed in claim 1, wherein at least one rib is formed on an inner surface of the casing and extends along an axial direction of the casing, at least one groove being axially defined in an outer peripheral surface of the mounting portion of each bearing member corresponding to each of the at least one rib of the casing for receiving the at least one rib of the casing therein.

3. The self-lubricating composite bearing as claimed in claim 1, wherein the outer peripheral surface of the mounting portion of each bearing member fits the cross section of the accommodation space of the casing and being press-fitted into the casing tightly.

4. The self-lubricating composite bearing as claimed in claim 1, wherein each bearing member is made from lubricating oil impregnated porous material, forming at least one first neck at a middle thereof and at least one second neck at one of two ends thereof, the second necks and connection portions between the two adjacent bearing members cooperatively forming a neck portion of the bearing set, the storage room for storing a lubricating oil being defined between an inner surface of the casing and an outer surface of each of the at least one first neck.

5. The self-lubricating composite bearing as claimed in claim 1, wherein the set of multiple fine flow passages is a gap between the two adjacent bearing members.

6. The self-lubricating composite bearing as claimed in claim 1, wherein the two adjacent bearing members are reversely abutted against each other, the connection portion of one bearing member is abutted against the connection portion of the other bearing member.

7. The self-lubricating composite bearing as claimed in claim 6, wherein a cross-sectional area of the set of multiple fine flow passages is double that of the notches.

8. The self-lubricating composite bearing as claimed in claim 1, wherein the two adjacent bearing members are arranged in the same direction and connected in series, the connection portion of one bearing member is abutted against an end on the opposite side of the connection portion of the other bearing member.

9. The self-lubricating composite bearing as claimed in claim 8, wherein a cross-sectional area of the set of multiple fine flow passages is equal to that of the notches.

10. The self-lubricating composite bearing as claimed in claim 1, wherein two of the bearing members of the bearing set are integrally formed as a monolithic piece.

11. The self-lubricating composite bearing as claimed in claim 1, wherein one of the bearing members of the bearing set and the casing are integrally formed as a monolithic piece.

12. The self-lubricating composite bearing as claimed in claim 1, wherein an average equivalent/hydraulic diameter of the set of multiple fine flow passages of the self-lubricating composite bearing is not smaller than 0.01 millimeter and not larger than $(1.6\ D*T/n)^{0.5}$ millimeter, where the symbol D indicates a diameter in millimeter of the axial hole of the bearing set, the symbol T indicates an axial length in millimeter of the axial hole of the bearing set, and the symbol n indicates a number of the fine flow passages.

13. The self-lubricating composite bearing as claimed in claim 1, wherein the lubricant stored in the storage chamber is grease.

14. The self-lubricating composite bearing as claimed in claim 1, wherein the lubricant stored in the storage chamber is a hybrid lubrication agent containing solid lubricating grains.

15. The self-lubricating composite bearing as claimed in claim 1, wherein the storage chamber is in fluid communication with environment via at least one air passage.

* * * * *